US010042091B2

(12) United States Patent
Kildishev et al.

(10) Patent No.: US 10,042,091 B2
(45) Date of Patent: Aug. 7, 2018

(54) HOLEY OPTICAL DEVICE

(71) Applicant: Purdue Research Foundation, West Lafayette, IN (US)

(72) Inventors: Alexander Kildishev, West Lafayette, IN (US); Satoshi Ishii, Hyogo (JP); Vladimir Shalaev, West Layfayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 288 days.

(21) Appl. No.: 14/431,544

(22) PCT Filed: Sep. 26, 2013

(86) PCT No.: PCT/US2013/061917
§ 371 (c)(1),
(2) Date: Mar. 26, 2015

(87) PCT Pub. No.: WO2014/099081
PCT Pub. Date: Jun. 26, 2014

(65) Prior Publication Data
US 2015/0247960 A1    Sep. 3, 2015

Related U.S. Application Data

(60) Provisional application No. 61/707,946, filed on Sep. 29, 2012.

(51) Int. Cl.
*G02F 1/03* (2006.01)
*G02B 3/08* (2006.01)
(Continued)

(52) U.S. Cl.
CPC ............... *G02B 3/08* (2013.01); *G02B 1/002* (2013.01); *G02B 1/005* (2013.01); *G02B 3/0087* (2013.01);
(Continued)

(58) Field of Classification Search
CPC  G02B 3/0087; G02B 1/002; G02B 2207/101; G02B 3/08; G02F 1/365;
(Continued)

(56) References Cited

U.S. PATENT DOCUMENTS 5,278,925 A * 1/1994 Boysel .................. G02B 6/122
385/14
5,585,968 A * 12/1996 Guhman .............. G02B 3/0087
359/565
(Continued)

*Primary Examiner* — William R Alexander
*Assistant Examiner* — Balram Parbadia
(74) *Attorney, Agent, or Firm* — Purdue Research Foundation

(57) ABSTRACT

A planar optical device, comprised of sets of nanometer-scale holes milled into a thin metal or ceramic film of subwavelength thickness serves to form arbitrary waveform of light. The holes form a pattern, preferably rings, of various sizes in order to achieve a given phase front of light due to photonic effect. When designed as a lens, the device focuses incident light into a tight focal spot. In symmetric design, the focusing property of the device does not depend on the incident polarization angle. The lens can be manufactured based on high-throughput fabrication methods and easily integrated with a chip or placed at the end of an optical fiber.

19 Claims, 6 Drawing Sheets

(51) Int. Cl.
*G02B 1/00* (2006.01)
*G02B 3/00* (2006.01)
*G02F 1/225* (2006.01)
*G02F 1/365* (2006.01)
*G02F 1/39* (2006.01)
*G02B 5/00* (2006.01)
*G02B 6/122* (2006.01)
*G02B 6/26* (2006.01)
*B82Y 20/00* (2011.01)

(52) U.S. Cl.
CPC ........... *G02B 5/008* (2013.01); *G02B 6/1226* (2013.01); *G02F 1/2255* (2013.01); *G02F 1/365* (2013.01); *G02F 1/397* (2013.01); *B82Y 20/00* (2013.01); *G02B 6/1225* (2013.01); *G02B 6/262* (2013.01); *G02B 2207/101* (2013.01); *G02F 2203/06* (2013.01); *G02F 2203/13* (2013.01); *G02F 2203/50* (2013.01); *Y10S 977/888* (2013.01)

(58) Field of Classification Search
CPC .... G02F 2203/13; G02F 2203/50; G02F 1/03; Y10T 428/249961; Y10T 428/249969; Y10T 428/249978
See application file for complete search history.

(56) References Cited

U.S. PATENT DOCUMENTS

| | | | | |
|---|---|---|---|---|
| 5,723,207 | A * | 3/1998 | Lettington | C23C 14/0641 204/192.12 |
| 6,836,494 | B1 * | 12/2004 | Stuart | G02F 1/353 372/39 |
| 7,560,707 | B2 * | 7/2009 | Bratkovski | B82Y 20/00 250/458.1 |
| 8,254,421 | B1 * | 8/2012 | Furuya | G02F 1/0327 359/328 |
| 2003/0016905 | A1 * | 1/2003 | Kondoh | G02F 1/315 385/18 |
| 2007/0058982 | A1 * | 3/2007 | Onishi | B82Y 20/00 398/152 |
| 2008/0049291 | A1 * | 2/2008 | Baek | G02B 5/10 359/223.1 |
| 2011/0188805 | A1 * | 8/2011 | Fu | G02B 6/34 385/37 |
| 2012/0194911 | A1 * | 8/2012 | Li | G02B 5/1809 359/566 |
| 2013/0308179 | A1 * | 11/2013 | Chen | B82Y 20/00 359/345 |

* cited by examiner

HOLEY OPTICAL DEVICE

CROSS-REFERENCE TO RELATED APPLICATIONS

This patent application claims priority to, and incorporates fully by reference, and is a U.S. § 371 national stage entry of, International Patent Application Serial No. PCT/US2013/61917 filed Sep. 26, 2013 which is related to and claims priority to U.S. Provisional Patent Application No. 61/707,946, filed Sep. 29, 2012. All of the above applications are incorporated by reference in their entirety.

STATEMENT REGARDING FEDERALLY SPONSORED RESEARCH

This invention was made with government support under N00014-10-1-0942 awarded by the Office of Naval Research. The government has certain rights in the invention.

FIELD OF THE INVENTION

This invention relates to optical devices and in particular to those devices used in compact optical systems and other micro-scale technologies.

BACKGROUND OF THE INVENTION

Scaling down optical elements is essential for making compact optical systems. Accordingly, planar and thin metastructures are desirable for fabrication as well as for integration simplicity. Currently, dielectric-based refraction microlenses typically used in optical systems have a nonuniform design, with a thickness of tens of micrometers. Gradient-index lenses are planar; however, their thicknesses are about an order of magnitude larger than the wavelength of incident light and the fabrication process is not straightforward. Classical diffraction lenses, such as Fresnel lenses, are planar and thin; however, they cannot control the phases precisely because the position of each Fresnel ring is determined by the geometry. Phase-controlled diffractive microlenses present a combination of a diffraction lens and a refraction lens, and have been studied both experimentally and numerically, but their structures are not planar.

Recently, there has formed a growing interest in planar, sub-wavelength-thick metallic lenses in the optical range. Different kinds of metallic lenses have been proposed and experimentally demonstrated, such as the superlens, the hyperlens, surface-plasmon focusing lenses, and superoscillation-based lenses. Some of the metallic lenses result in focus spots on surfaces, while others focus in far field. Nanoslit lenses are one of the planar metallic lenses which are made of arrays of subwavelength slits milled into metallic films. Each slit width is varied to change the mode index of the single-mode light propagating through it, such that light transmitted through different slits experience different phase delays. Hence, for example, by using a symmetric array of slits with decaying phase shifts relative to the optical axis, it is possible to arrange a concave phase front, and focus a linearly polarized transmitted light. The very first designs of nanoslit metal lenses were first modeled numerically and then demonstrated experimentally.

The early work in this area dealt with plasmonic mode propagation through metallic slits. The inventors of the present invention have also recently shown that photonic modes can be efficiently used to introduce phase delay; see, for example, Ishii, S. et al. *Opt. Lett.* 2011, 36, (4), 451-453, incorporated in its entirety into the present disclosure. The use of either plasmonic mode or a photonic mode enable the ability to design polarization-selective nanoslit lenses whose focusing properties become either a convex (light-focusing) or concave (light-diverging) lens depending on the incident linear polarizations. The focusing properties of the nanoslit lenses can be additionally controlled by incorporating liquid crystals inside the slits.

Although nanoslit lenses are indeed planar and quite thin, an important drawback of the nanoslit design is its polarization-dependence. Moreover, as a nanoslit lens is focusing light into a narrow strip, it does not allow for high-intensity confinement of light into a wavelength-size circular spot. For some applications, the above features hinder the reduction of nanoslit lenses to practice. Thus, there is a need for a novel thin and planar optical device that addresses the drawbacks identified above.

SUMMARY OF THE INVENTION

A polarization-independent optical device for bending light. The optical device consists of holes with a width less than the wavelength of light, which are formed into a thin film. The holes create a specific pattern; for example, concentric rings with increasing diameter, where the holes of each ring are the same size, but the holes of each successive ring moving outward decrease in size. The change in hole size throughout the pattern creates various phase changes, or bending angles, of the light as it enters, proceeds through the hole, and exits on the opposite side of the film, thus focusing or diffracting the light at a desired distance. After the holes are milled into the film, a filler is applied to the device in order to fill the holes and give the film a thin coating. In one embodiment the filler is a nonlinear medium allowing control of the device properties via a control signal applied. In another embodiment, the filler is a gain medium amplifying the incoming radiation. The optical device can be designed employing any given pattern of holes or slits. The focal point of the optical device can also be adjusted by varying the wavelength of incoming light.

(PMMA) spin coating process.

FIGS. 5A-5F display pseudo-color cross section maps of E-field intensity, obtained experimentally above the sample for x-polarized light (FIGS. A, C, E) and y-polarized light (FIGS. B, D, F) at 488 nm (A,B), 531 nm (C, D), and 647 nm (E, F). The x-y planes are at $z=1$ μm, the y-z planes are at $x=0$, and the z-x planes are at $y=0$. The insets show the beam x-y cross sections at focuses for each wavelength (for A and B, $z=8$ μm; for C and D, $z=10$ μm; and for E and F, $z=12$ μm).

FIGS. 6A and 6B display pseudo-color cross section maps based on experimentally measured transmission through the sample of left-circularly-polarized light (6A) and right-circularly-polarized light (6B) at 531 nm. The x-y planes are at $z=1$ μm, the y-z planes are at $x=0$, and the z-x planes are at $y=0$. The insets show the beam x-y cross sections at $z=10$ μm.

Figure 7:
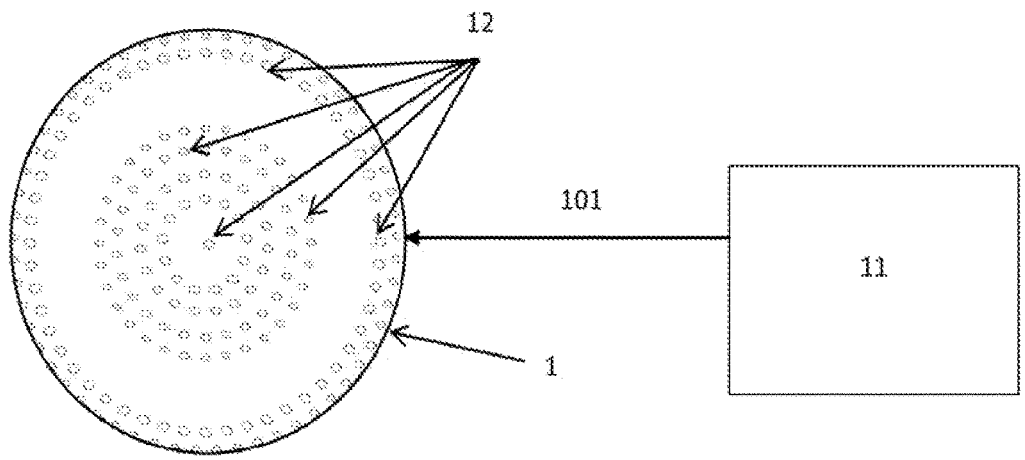

FIG. 7 is a schematic of how the control unit 11 sends a signal 101 to the optical device 1, which is filled and coated with a filler (PMMA or other non-linear Kerr media) 12.

Figure 8:
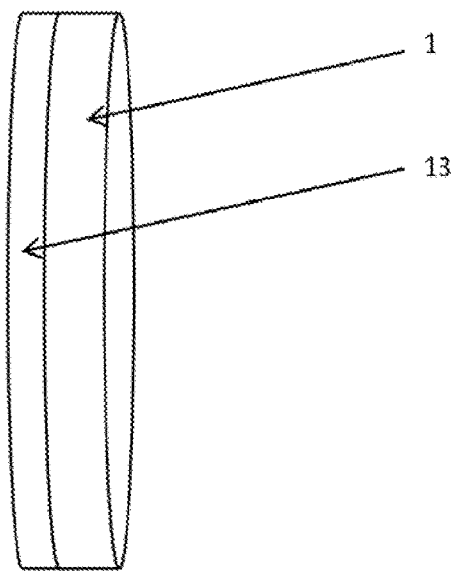

FIG. 8 displays the optional adhesive layer 13 which can be coupled to one side of the optical device 1 for attachment to the core of an optical fiber.

DETAILED DESCRIPTION OF THE PREFERRED EMBODIMENT

Figure 1:
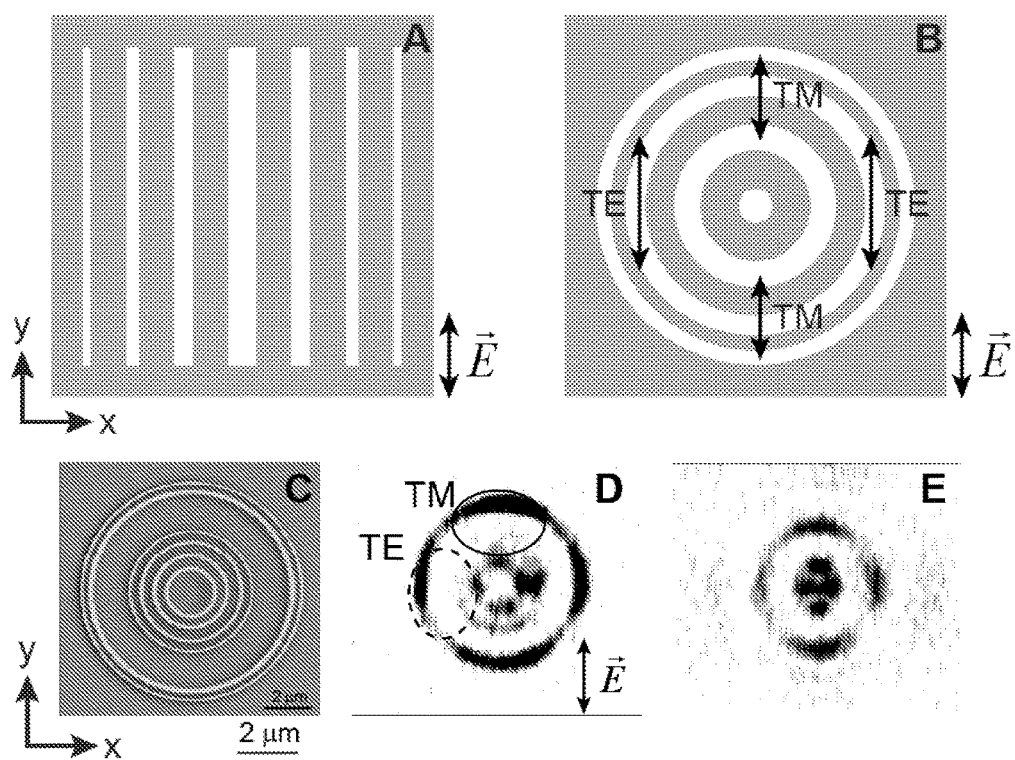
FIG. 1A is a schematic of a nanoslit optical device.
FIG. 1B is a schematic of an optical device with concentric rings-slits.
FIG. 1C is an SEM image of a five concentric rings sample milled into a 380-nm thick gold film.
FIGS. 1D and 1E are experimentally-captured CCD images of the sample at the surface (z=0 μm) and at the focus (z=10 μm), respectively. The polarization is parallel to the x-axis. The scale and coordinates of FIGS. 1D and 1E are substantially identical to the scale and coordinates of FIG. 1C.

A novel optical device with nanoslits or holes is disclosed. The holes are designed in the form of straight slits (defined as holes forming a rectangular or linear shape) or non-uniform circular slits (defined as holes forming shapes such as ellipses, ovals, elongated circles, or any other non-perfect round shape). In one embodiment of the present invention, a two-dimensional traditional nanoslit arrangement (See FIG. 1A) is further developed to create a circular format. Concentric nanoslits with different widths are arranged in a pattern similar to FIG. 1B and realized, according to one embodiment of the present invention, by milling into a thin metal film. In this embodiment, the optical device will cause arbitrary waveform formation to focus linearly polarized light into a smaller circular spot. For example, when x-polarized light is transmitted through the device, some areas of the circular slit perform as slit waveguides upon TM-excitation (where the E-field is parallel to the radial direction), while other areas of the same slit perform as slit waveguides upon TE-polarization (as shown in FIG. 1B). However, since the dependence of mode index on slit-width in plasmonic mode with TM-excitation is opposite to that in photonic mode with TE-polarization, such design (i.e. FIG. 1B) will not focus light into a circular spot unless (1) the slit widths are non-uniform or (2) the slits are non-circular (e.g. ellipses, non-perfect rounds, elongated circles, etc.). With such a design, the axial symmetry of the optical device for arbitrarily-polarized light is lost, and the performance of the device becomes polarization dependent.

In order to solve the above polarization dependency and focus an arbitrarily-polarized light, while also avoiding design complexity, each concentric slit can instead be further separated into smaller nanoslits, or holes, in any variety of patterns, or arrays. By changing the radius or size of the holes, one modifies the effective refractive index within that hole. With a pattern of holes of varying radii, the radiation transmitted through each hole will experience a different modification (conversion), or phase change. These different phase changes of incoming radiation, which are due to varying effective refraction indices inside each hole, combine to form a desired phase front of radiation emitted through all the holes in one optical device combined.

For example, and in one embodiment of the present invention, a pattern of circular slits can be further discretized into a circular array of radially equidistant, identical elliptical holes. Thus, each concentric circular slit now consists of smaller elliptical slits arranged in a circle, equidistant from and identical to each other (i.e. a set of concentric arrays, or rings, of holes). The phase front of transmitted light is controlled by adjusting the radii of the holes within each array. Such adjustment of hole radius to achieve phase control and arbitrary waveform formation has not been explored in this field and thus is a novel aspect of the claimed invention. The design of this specific embodiment supports axial symmetry both globally (i.e. with regard to the ring or array of holes) and locally (i.e. with regard to each individual hole). This allows the device to focus normally incident, linearly-polarized light upon any polarization angle. It should be noted, however, that the pattern of elliptical concentric holes is only one design embodiment of the present invention, and that any pattern of holes flowing from the formulas disclosed herein is similarly disclosed. Global and local symmetries are possible features of the design, but they are not required features.

FIG. 2A schematically shows the device 1 operation. Incoming light beam 2 with an arbitrary wavefront 3 is experiencing phase and intensity change passing through the device 1. The pattern of the device 1 creates a given wavefront 5 of the outcoming light beam 4. FIG. 2A shows a particular case when the device forms a spherical waveform focusing in a focal point 6. Note that the focal length depends on the wavelength of the incoming light. Therefore the distance between the device 1 and the focal point 6 depends on the wavelength and can be changed by changing the wavelength of incoming light.

The properties of the device 1 can be changed by a control unit 11 via a control signal 101, which will be described below.

In one embodiment of the present invention, each hole is filled with Poly(methyl methacrylate), or PMMA—a polymer, which, when applied, also forms a 200 nm-thick film on top of the gold film. The placement of gain material or other nonlinear material 12, such as PMMA, inside the holes creates additional benefits. PMMA, or other gain media, increases the transmissibility of electromagnetic radiation through each hole by compensating losses. Any coating also creates a protective layer for the optical device material. The insertion of other nonlinear materials (e.g. non-linear Kerr medium comprised of barium titanate) allows for the creation of an optical device for arbitrary wave formation that is adjustable. This means, for example, that the focal length of a focusing optical device can be changed, or tuned, by varying the wavelength of incoming electromagnetic radiation. A similar tuning effect can be achieved for a de-focusing or hologram-forming optical device filled with a nonlinear material. The speed of this change is similar to the Kerr effect, on the order of a picosecond (in time domain, on the order of one Terahertz, THz). The change, or tuning effect, is achieved via a control unit 11 connected to the optical device 1. The control unit 11 sends a signal 101 to the optical device 1 which in turn changes the operating function of the device. The signal from the control unit can be sent very quickly and can cause a modified operating function within a matter of picoseconds. This embodiment is especially useful for adaptive optics and deformed image correction applications.

The presently claimed design of concentric arrays of holes is built on very different operational principles than photon sieves, which have been used to improve the focusing property of binary Fresnel zone plates. While photon sieves deal with multi-mode intensities diffracted by holes with wavelength-scale diameters, the design according to the claimed invention, built on wavefront-engineering, uses single-mode phase shifts obtained with holes of subwavelength-scale diameters.

Each hole milled into a metallic film can be considered a finite-length waveguide with metal cladding. It should also be noted that in the optical range, electromagnetic fields penetrate the metal cladding because the magnitude of the metal's permittivity is in the range of one (1) to two (2). Thus, propagating hybrid modes are excited; however, below the surface plasmon frequency, the only propagating mode in a subwavelength hole is $HE_{11}$ mode, and thus the presently claimed design achieves a single-mode regime (i.e. monochromatic operation).

Figure 2:
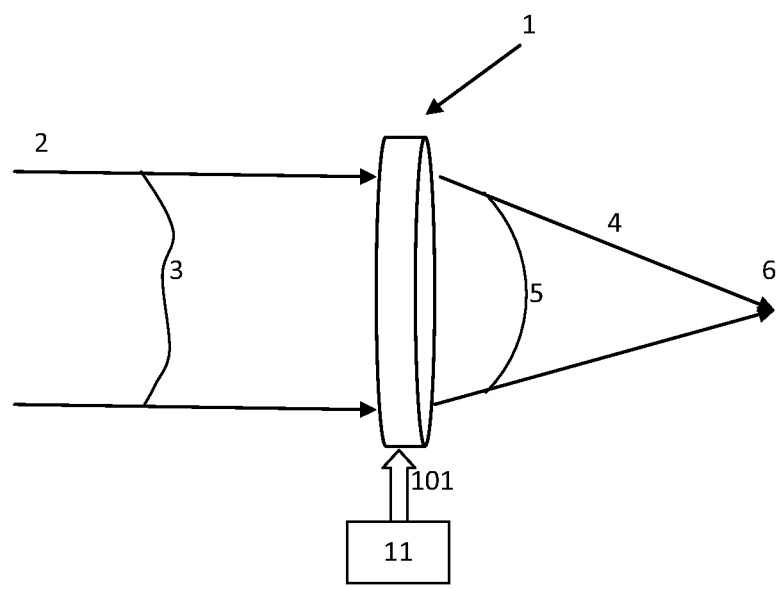
FIG. 2A describes the optical device operation.
FIG. 2B illustrates the numerically evaluated relationship between phase and radius of the nanoslit when 531-nm plane waves (both linearly and circularly polarized) are transmitted through a variable-radius hole in a 380-nm thick gold film in far field.
Figure 2B:
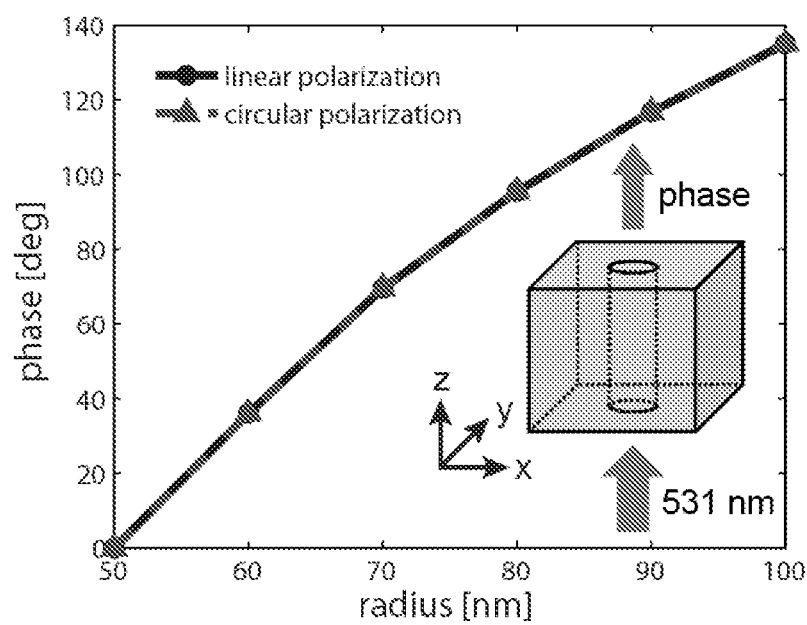

Similar to the dependence of output phase on width for metal slits, the phase of light (i.e. electromagnetic radiation) coming through a hole in the presently claimed invention is a function of the hole radius. Using a three-dimensional spatial harmonic analysis method, the output phase of a 531-nm linearly polarized light propagating through a 380-nm long hole (i.e. a hole milled into 380-nm thick gold film) from the glass substrate side can be simulated. A refractive index of 1.5 is used (to match the refractive index of Poly(methyl methacrylate) (PMMA)). The relative phases of the output are evaluated in far field. FIG. 2 shows the results and the relationship between phase and hole radius. As the hole radius or diameter increases and the opening becomes less confined, the mode index, and therefore the phase, increase. Such dependence is similar to photonic mode propagation through a metallic slit. And so, by placing holes with the largest radii towards the center and gradually decreasing the radius of the holes in each successive concentric ring, the output light from the device can be concentrated into a tight focal spot. Additionally, it has been numerically examined and shown that the same design achieves phase control for circularly polarized light (also shown in FIG. 2).

The opposite effect (i.e. diffraction) can be achieved by reversing the pattern described directly above. In this case, holes with the smallest radii are located toward the center with a gradual increase in hole radius of each successive concentric ring outward. This design will similarly achieve phase control for circularly polarized light in addition to linearly polarized light. This pattern of concentric rings formed by individual holes is only one embodiment of the presently claimed invention. It should be noted that this specific design encompasses only one embodiment of the present invention, and the array of holes need not form any single particular pattern so long as each individual hole or nanoslit is either a straight slit or a non-uniform circular slit.

After phase-radius dependence is obtained, a focusing holey optical device is designed. For best results, the wavelength of the incoming radiation and the selectivity bandwidth should differ by a maximum of ten percent (10%), and preferably less. In order to design the device, an analytical model based on a 3D Green's function is used, in the same way as a 2D Green's function has been used to design nanoslit lenses, to estimate the focusing performance of the device. Using the reciprocity principle, a dipole point source is located, emitting light with a free space wavelength $l_0$ at the desired focal point of the system, F(0, 0, f), where f is the focal length. In 3D space, the far field emitted from a point source is proportional to a Green's function, given by:

$$G(r)=e^{ikr}r^{-1},$$

where $r=\sqrt{(x^2+y^2+(z-f)^2)}$ and $k=2pl_0^{-1}$.

Figure 3:
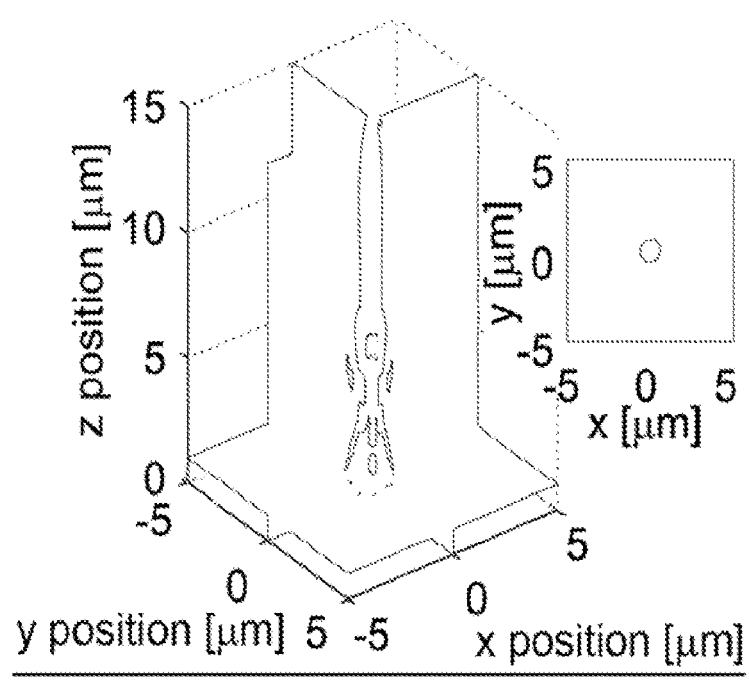
FIG. 3 shows a pseudo-color map of the E-field intensity of the sample calculated from the analytical model. The color scale is normalized to the maximal intensity. The inset shows the beam cross section at the focal point (z=10 μm).

The phase φ(x, y, 0), relative to the origin O(0, 0, 0) on the x-y plane, is retrieved by taking the argument of the Green's function. To model the performance of the device (i.e. the transmission profile), dipolar point sources are placed at discrete locations where the phases are retrieved and the initial phases are assigned to the retrieved phase delays. FIG. 3 shows the plot for intensity of an optical device for f=10 μm and $l_0$=531 nm. The locations of the dipolar point sources correspond to the center positions of the holes shown in FIG. 4. The field intensity calculated by this computationally low-cost analytical model captures the major features of the experimentally measured results, as discussed below.

The optical device can be designed as follows. A 380-nm thick gold film is deposited on a glass substrate. Holes are milled, or perforated, through the gold film by a focused ion beam (FIB) system to create a pattern similar to that portrayed by the SEM image in FIG. 4. It should be noted that FIG. 4 displays only one embodiment of the present invention, and thus does not limit the design of placing holes in other patterns (e.g. variance in distance from the origin, hole radius, number of holes, etc.). The detailed structure of the system of the present embodiment is summarized in Table 1 below.

TABLE 1

Figure 4:
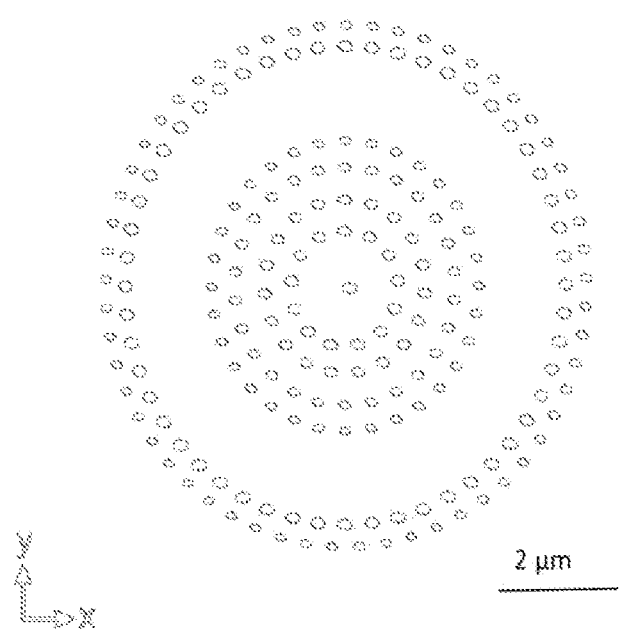
FIG. 4 is an SEM image of the sample before the poly(methyl methacrylate)
Figure 5A:
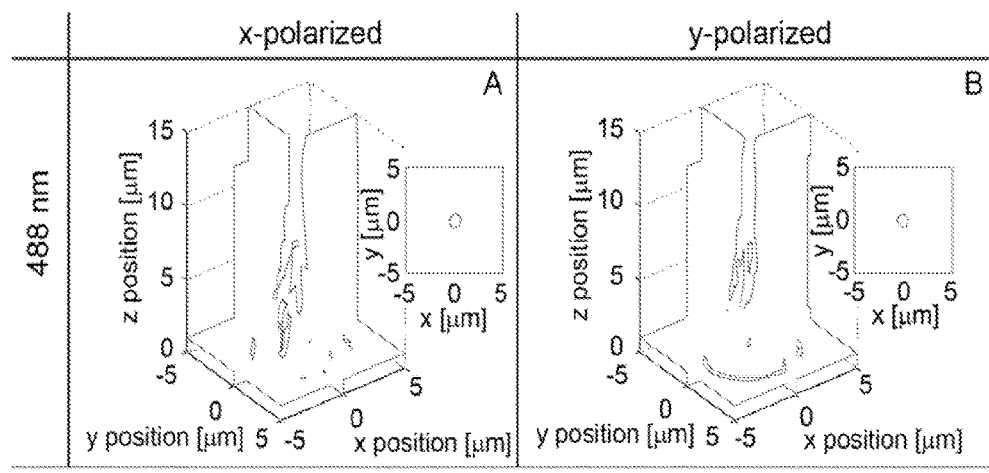
Figure 5C:
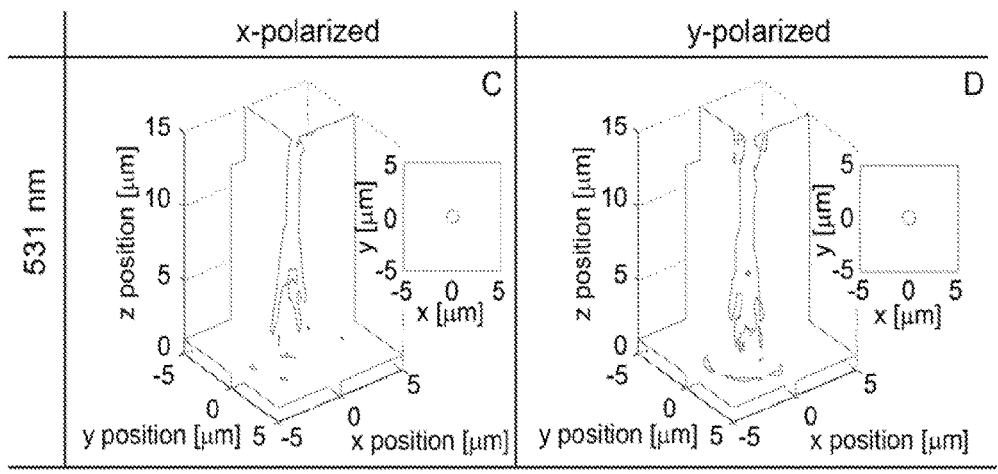
Figure 5E:
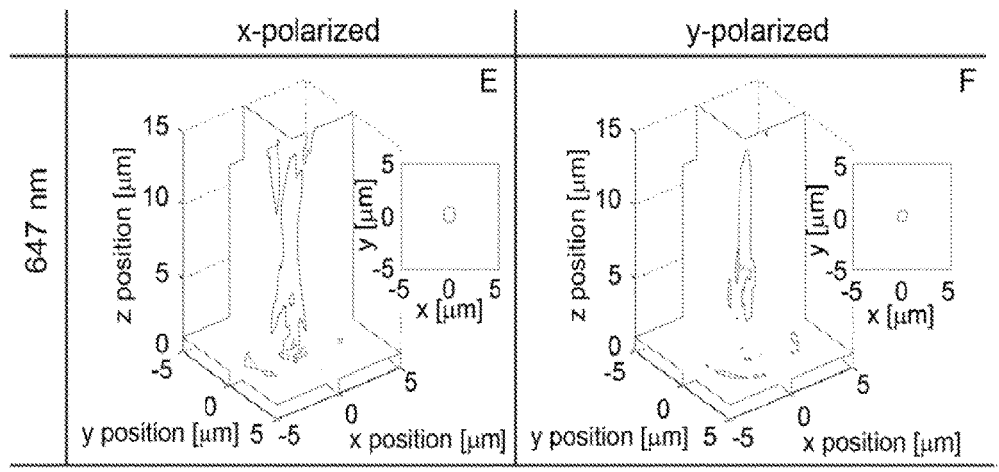

Design parameters of the sample in FIG. 4.

| Concentric ring number | 1 | 2 | 3 | 4 | 5 | 6 | 7 |
|---|---|---|---|---|---|---|---|
| Distance from the origin (μm) | 0 | .8 | 1.2 | 1.6 | 2.0 | 3.3 | 3.63 |
| Hole radius (nm) | 83 | 76 | 69 | 62 | 56 | 83 | 56 |
| Number of holes (per ring) | 1 | 13 | 19 | 26 | 32 | 52 | 57 |

After the FIB fabrication step, PMMA is spin-coated on the sample and the sample is baked. The PMMA fills the holes and also creates a 200-nm thick uniform film on the gold surface. Such filling of the holes with polymer decreases the cutoff radii.

Once the gold film is properly coated, transmissions through the sample are recorded using a microscope setup with a CCD. The transmissions in this particular experiment were performed at wavelengths of 488 nm, 531 nm, and 647 nm, in two orthogonal linear polarizations. At 531 nm, the transmissions were also recorded upon circularly polarized incidence. The resolution of the microscope stage in z axis is ±250 nm and the depth of field of the microscope setup is about 500 nm.

In another embodiment of the present invention, the slit-ring sample shown in FIG. 1C has concentric radii identical to the sample shown in FIG. 4, and each ring width in FIG. 1C is equal to the corresponding hole diameter of the sample shown in Table 1. Definition of optical measurements and fabrication of the slit-ring sample shown in FIG. 1C is performed using the same process as described above.

FIG. 5 summarizes the transmission measurements through the sample shown in FIG. 4. The sample is illuminated from the substrate side by a polarized laser source emitting the following types of light: x-polarized light with a wavelength of 488 nm (5A), x-polarized light with a wavelength of 531 nm (5C), x-polarized light with a wavelength of 647 nm (5E), and y-polarized light with the same three wavelengths (488 nm (5B), 531 nm (5D), 647 nm (5F)). Identical focal lengths are obtained regardless of the polarization of the light source (x-polarized vs. y-polarized). For 488 nm illumination, the focal length is 8 μm; for 531 nm illumination, the focal length is 10 μm; and for 647 nm illumination, the focal length is 12 μm. This experiment shows that the optical device focuses incident light in accordance with the original and intended design, and that such focusing is not polarization-dependent. The slight discrepancies between the experimental results and simulations can be caused by imperfection of the hole shape or potential damaging of the hole edge by gallium during FIB fabrication. Nevertheless, the analytical model can be utilized for rapid prototyping, with potential uses in further optimization of devices through full-wave finite element modeling. The insets corresponding to each image of FIG. 5 show a pseudo-color x-y map of the E-field intensity at the focal point. As shown, the focus profiles do not depend on the incident polarization. The focus spots are also circular, as distinguished from the focus spots resulting from a slit-ring design, as shown in FIG. 1E. Finally, and significantly, the results show that by changing the incident wavelength, the focal distance of the same optical device can be shifted.

Figure 6:
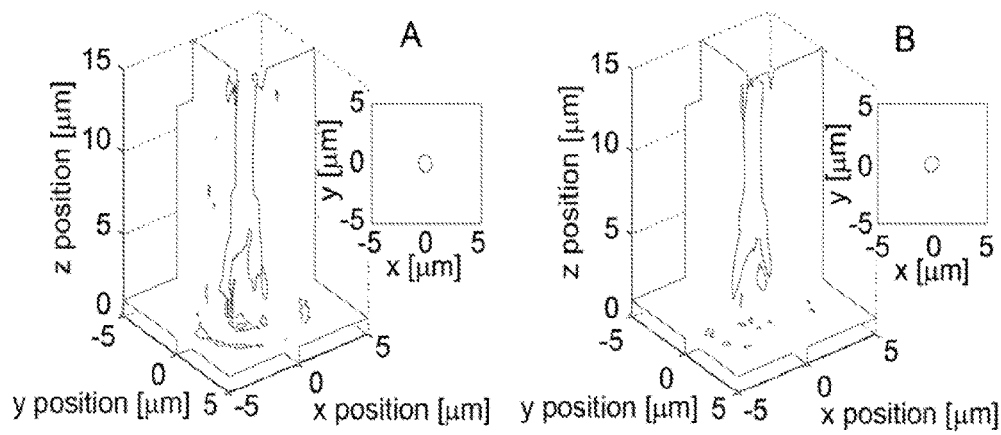

FIG. 6 shows the measured results for circularly polarized incident light with a wavelength of 531 nm. FIG. 6A displays the result of a left-circularly polarized incident light; FIG. 6B displays the result of a right-circularly polarized incident light. As expected from the information provided by FIG. 2, the focal lengths and focusing profiles for left- and right-circular polarizations are very similar to the results shown in FIGS. 5C and 5D (i.e. the results of x- and y-polarized incident light at 531 nm). These results further show the incident polarization independence of the optical device claimed herein.

The above disclosure serves to demonstrate the performance of the presently claimed polarization-independent holey optical device. First, by changing the radius or size of subwavelength holes milled into a metallic film, which act as single-mode waveguide elements, the phase of light transmitted through the holes in the film can be controlled. Second, by milling specific patterns of subwavelength holes with different radii to form a desired phase front, specifically desired transmission properties are achieved. The patterns of subwavelength holes can be redesigned not only to control focusing and focal distances but also to create de-focusing devices and hologram-forming devices (based on the same principles). Third, the holey optical device structure can be filled with a gain medium such as PMMA to compensate losses. It should be noted, however, that other nonlinear materials can be used to fill the holes instead of PMMA. While filling the holes with a gain medium compensates losses, a nonlinear material filling makes the focal length of the device tunable by the incident power. Finally, it should also be noted that the presently claimed invention need not be milled into a gold film. Any material with a negative permittivity can be used. Examples of other materials include, but are not limited to, aluminum, silver, copper, silicon carbide, and titanium nitride (and other ceramics).

The design according to the present disclosure is simple and planar, thus allowing for high throughput fabrication methods, such as nanoimprint lithography or laser dynamic forming. If a ceramic is used (e.g. titanium nitride), even higher powered lasers can be used due to the higher melting point. The compact design of the device is helpful in achieving focal distances on the order of one micrometer for on-chip devices as well as fiber-coupled devices. Additional applications of the presently disclosed device include electronic circuits and sensors, as well as fiber optics. With respect to those devices filled with gain media or other nonlinear material for adjustable tuning based on incoming radiation wavelength, applications include adaptive optics for distorted imaging correction.

Gain media filler applied to compensating losses and amplification of light inside the holes can be made for example of a common organic dye, such as R800, R6G, and R101, and their COTS analogs embedded in a polymer host, such as for example, PVA.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The invention claimed is:

1. A planar polarization-independent optical device for arbitrary waveform formation, comprising:
   a plurality of subwavelength-scale holes with varying radii milled vertically into a film, wherein said holes form a pattern, wherein a radius of each hole determines an effective refractive index for said hole, said effective refractive index modifying a phase and an intensity of an incoming electromagnetic radiation as the radiation propagates through said hole, and wherein a desired phase front of total outputted electromagnetic radiation emitted out of all holes is created, thus achieving phase control in said film, wherein the device is operating equally for each linearly polarized radiation simultaneously, wherein the each linearly polarized radiation is normally incident on the device.

2. The device of claim 1, wherein a focal distance of the optical device, which is operating as a lens, is controlled by adjustment of a wavelength of the incoming electromagnetic radiation.

3. The device of claim 2, wherein a focal distance of the optical device is in the range from one to twenty micrometer.

4. The device of claim 1, further comprising a filler applied to the device after the holes are milled, the filler filling the holes.

5. The device of claim 4, wherein the filler is a non-linear Kerr medium.

6. The device of claim 5, wherein the Kerr medium changes an intensity of incident electromagnetic radiation and controls the device operation in real time.

7. The device of claim 6, further comprising a control unit, the control unit applying a signal to the device thus changing an operating function of the device in real time with THz frequency.

8. The device of claim 4, wherein the filler is a gain medium serving for amplification of the radiation intensity and compensation for plasmonic losses.

9. The device of claim 1, wherein said film is a pure metal film comprised of gold, aluminum, silver, or copper.

10. The device of claim 1, wherein said film is a ceramic film made of silicon carbide.

11. The device of claim 1, wherein said film is a non-stoichiometric ceramic film made of titanium nitride, or zirconium nitride.

12. The device of claim 1, wherein the phase change increases as the hole radius becomes larger.

13. The device of claim 1, wherein said film comprises gold, silver, or copper.

14. A method for arbitrary waveform formation, comprising:
  milling a pattern of a plurality of subwavelength-scale holes into a film, wherein said pattern comprises holes of varying width corresponding to a desired effective refractive index within each hole, wherein said effective refractive index of each individual hole modifies a phase and an intensity magnitude of the radiation propagating through said individual hole, and outputting an output radiation, wherein said output radiation propagates through each individual hole and experiences various refractive modifications, thus outputting a desired phase front of radiation from all holes in said film, wherein an entirety of the film comprises a pure metal, wherein a device containing the film is operating equally for each linearly polarized radiation simultaneously, wherein the each linearly polarized radiation is normally incident on the device.

15. The method of claim 14, wherein the radiation is a radiation in an optical range.

16. The method of claim 14, wherein prior to milling, depositing the film on a fiber core covered with an adhesive layer.

17. The method of claim 14, further comprising: applying a filler to the holes after the holes are milled, the filler filling the holes, the filler is a non-linear Kerr medium.

18. The method of claim 17, wherein the Kerr medium changes an intensity of incident electromagnetic radiation and controls the device operation in real time.

19. The method of claim 14, wherein the pure metal film comprises gold, aluminum, silver, or copper.

* * * * *